April 27, 1965 A. J. JONES ETAL 3,180,076
TOOL PATH CONTROL MECHANISM
Filed April 9, 1963 2 Sheets-Sheet 1
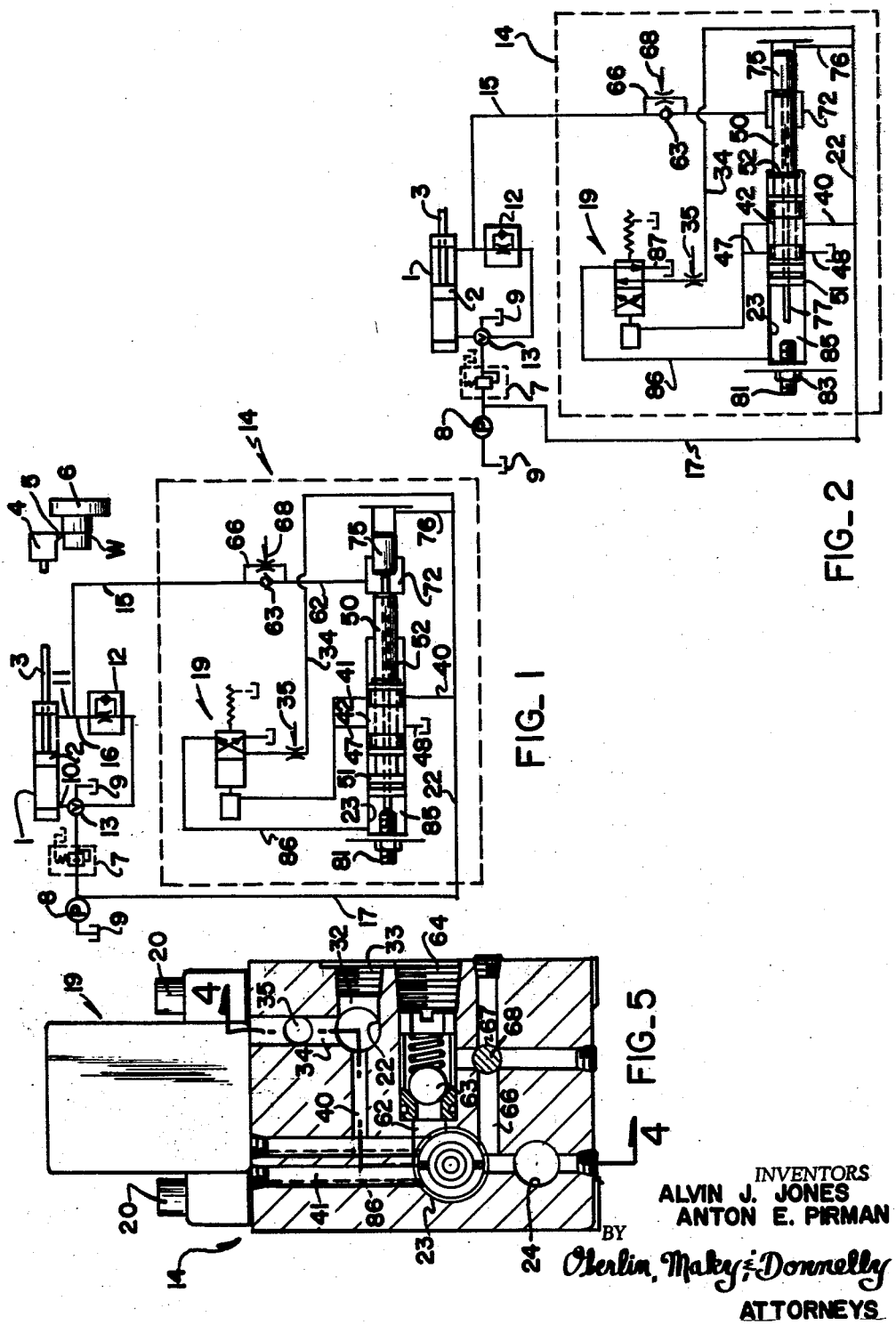
INVENTORS
ALVIN J. JONES
ANTON E. PIRMAN
BY Oberlin, Maky & Donnelly
ATTORNEYS

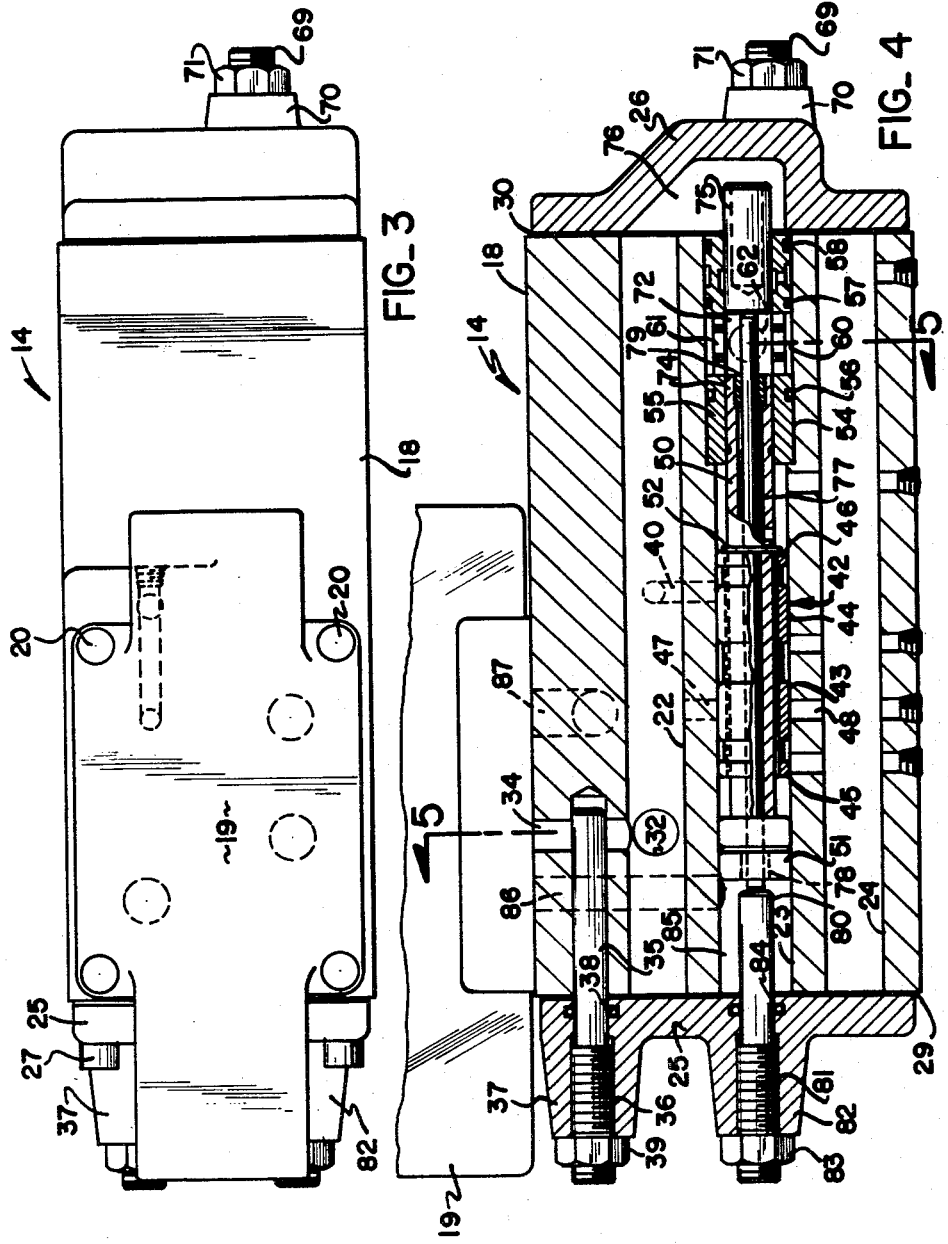

United States Patent Office 3,180,076
Patented Apr. 27, 1965

3,180,076
TOOL PATH CONTROL MECHANISM
Alvin J. Jones, Gates Mills, and Anton E. Pirman, Euclid, Ohio, assignors to The Motch & Merryweather Machinery Company, Cleveland, Ohio, a corporation of Ohio
Filed Apr. 9, 1963, Ser. No. 271,784
11 Claims. (Cl. 60—10.5)

This invention relates generally, as indicated, to a tool path control mechanism and more particularly to a fluid operated pulse generator for a hydraulic tool feed mechanism.

In the turning of brake drums, shafts, and the like, the microscopic screw thread formed on such workpieces by the uniform lead of the cutting tool is undesirable. Such microscopic screw thread in brake drums will impart axial thrusts to the engaging brake shoes known in the art as "brake slap." Similarly, in most machinery retention of lubricants is accomplished by a sealing member against a rotating shaft and such microscopic screw threads on the shaft caused by the turning thereof on a lathe or other machine tool will tend to pump the lubricant out through the seal and, of course, cause rapid seal wear. Normally, a further finishing process is required for such workpieces to provide the desired surface finish and to prevent the aforementioned harmful effects of the microscopic screw threads on the workpieces.

In workpieces, such as the aforementioned brake drums, a certain surface finish is usually specified. This can be controlled by controlling the feed rate of the tool which is, of course, directly proportional to the production rate obtained. Thus, heretofore the finish obtained has been a function of the production rate. By slowing the feed rate of a tool, a smoother finish, of course, results and vice versa, by increasing the feed rate of the tool, a more rough finish is obtained. Moreover, in the turning of brake drums, the slide of the tool is usually set at a false angle to compensate for what is known as taper. This is apparently due to the constant pressure of the tool against the workpiece. It has been discovered that with a tool path control mechanism of the type shown herein, such false angle is no longer required of the slide and workpiece and, moreover, a truer more round workpiece is produced.

In modern automated machine tooling, one of the major problems encountered is the removal of the extremely long continuous chip generated by the cutting tool which is fed uniformly. Such chip cannot readily be flushed away by air or liquid and generally requires to be manually brushed away or removed. With the present invention, in addition to the above advantageous results, a continuous chip need not be produced, but instead a discontinuous chip of relatively short lengths which can easily be flushed or blown away.

Reference may be had to the copending application of Alvin J. Jones and Peter E. Forster, entitled "Tool Path Control Mechanism," filed February 25, 1963, Serial No. 260,478 for a disclosure of a tool path control mechanism which will create a pulse modifying the otherwise uniform feed rate of a cutting tool to provide the above advantages. However, in such application, there is disclosed a mechanical pulse generator wherein a motor or other driven rotating shaft is employed with the frequency of the generated pulse being controlled by selectivity in the speed of rotation of the rotating shaft. However, with the present invention, a purely hydraulic control is provided not requiring a rotating member and the speed controls therefor to control the frequency of the generated pulse.

It is therefore one main object of the present invention to provide a tool path control mechanism which will create a pulsation in the otherwise uniform feed of a cutting tool not requiring a rotating member to create and control the frequency of the generated pulse.

It is another main object of the present invention to provide a tool path control mechanism for the turning of brake drums, shafts and the like which will modify the uniform lead of the cutting tool to prevent the formation of microscopic screw thread.

It is still another main object to provide a hydraulically operable tool path control mechanism whereby a desired finish can be obtained on a workpiece, such as a brake drum or disc, and such is no longer solely a function of the tool feed rate.

It is a further object to provide a tool path control mechanism which will facilitate the production of higher quality workpieces in less time.

It is a still further object to provide a tool path control mechanism which will impart a series of waves with both forward and reverse slope within each cutting revolution instead of the microscopic screw thread normally provided by a uniform feed.

Still another object is the provision of a tool control mechanism which will produce a broken or discontinuous chip permitting the same readily to be flushed away.

Yet another object is the provision of a hydraulically operable pulse generator for a hydraulic tool feed producing a pulse having a controlled frequency and amplitude.

A yet further object is the provision of such generator which will cycle at the desired frequency without any drive other than the normal hydraulic circuit for the tool feed cylinder.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIGS. 1 and 2 are schematic flow diagrams of the tool path control mechanism in accordance with the present invention in alternate positions;

FIG. 3 is an enlarged top plan view of the pulse generating unit of the present invention;

FIG. 4 is a longitudinal vertical section taken substantially on the line 4—4 of FIG. 5; and FIG. 5 is a vertical section taken substantially on the line 5—5 of FIG. 4.

Referring now to the annexed drawings and more particularly to FIGS. 1 and 2, there is shown a hydraulic feed cylinder 1 having a piston 2 therein connected to a rod 3 extending through one end of the cylinder and connected to a tool holder or slide 4. A cutting tool 5 is mounted in the slide 4 and engages a workpiece W which may be mounted on a chuck 6 of a lathe or other similar machine tool so that as the workpiece is turned about its axis, and the tool 5 is moved longitudinally of the workpiece, it will mill or cut away the same. With a uniform feed rate, it will be understood that a continuous helical chip will be produced. Whereas the workpiece W is shown in the form of a shaft, it will readily be understood that it may be a brake drum, or any of a variety of workpiece shapes.

Hydraulic fluid may be supplied to the blind end of the cylinder 1 through pressure reducing valve 7 by means of a pump 8 having its inlet connected to reservoir 9 and its outlet connected at 10 to the cylinder. The hydraulic pressure created by the pump 8 will then cause the piston 2 to move to the right as seen in FIG. 1 causing the hydraulic fluid within the rod end of the cylinder 1 to exit through passage 11, through flow regulator 12 and back to the reservoir 9. Control valve 13 may be employed in the usual manner to retract the tool.

Without the present invention, the flow regulator 12, which may be of the variable resistance type, is then employed to control or regulate the feed rate of the tool 5 with respect to the rotating workpiece W. It will also be seen that the feed rate of the tool 5 is, of course, what controls the production rate for the machining operation and the slower the feed rate of the tool, the smoother the finish obtained.

In order to vary the otherwise uniform feed rate of the tool, as set by the flow regulator 12, there is provided a hydraulic pulse generating unit shown in outline at 14 in FIGS. 1 and 2 and in detail in FIGS. 3 through 5. The pulse generating unit 14 is provided with a fluid line 15 connected at 16 upstream of the flow regulator to the exhaust line 11 leading from the feed cylinder 1. Also connected to the pulse generating unit is a pressure line 17 which may be connected to a suitable source of hydraulic fluid under pressure such as the pump 8 upstream of the pressure reducing valve 7 supplying hydraulic pressure to the feed cylinder 1.

Referring now additionally to FIGS. 3, 4 and 5, it will be seen that the pulse generating unit 14 comprises a block 18 having mounted thereon a four-way spring offset valve 19 by means of suitable fasteners 20. The block 18 is provided with three main longitudinally extending bores 22, 23 and 24 and the ends of such bores are closed by cover plates 25 and 26, held to the end faces of the block 18 by suitable fasteners 27. High pressure gaskets 29 and 30 may be provided between the covers 25 and 26 and the end faces of the block 18, respectively.

The pressure bore or passageway 22 is connected through passageway 32 to the pressure supply line 17 by means of the tapped opening 33 (see FIG. 5). A passage 34, normal to both the inlet passage 32 and the main bore 22, leads from the main bore to the four-way spring offset valve 19. In such passage 34 is the stem 35 of a variable restrictor adjusting screw 36 threaded in boss 37 projecting from the cover 25. An O-ring or the like 38 is employed to seal the stem with respect to the cover and a nut 39 is employed to secure the stem 35 in its selected position. The stem 35 is mounted in a bore, which is normal to the passage 34, and in the position of the stem 35 in FIG. 4, the stem will completely block the passage. By rotating the stem 35, by suitable tools such as a screw driver or the like, the stem can be backed off to open to the desired degree the passage 34 leading to the valve 19. The passage 34 leading from the main pressure bore 22 to the valve 19 then constitutes the main pressure passage.

Also provided is a pilot passage 40 leading from the bore 22 to the bore 23. As seen in FIG. 5, the passage 40 extends horizontally from the bore 22 and then vertically to intersect the bore 23 on the near side of the center line of such bore. Pilot pressure is then ported from the passage 40 through the bore 23 to a vertically extending passage 41 on the far side of the center line of the bore 23 as viewed in FIG. 5 by means of a four land spool 42 (FIG. 4). The spool 42 comprises two relatively long intermediate lands 43 and 44 and two relatively short end lands 45 and 46. When in the position shown in FIGS. 1 and 4, the spool will then permit communication between the passages 40 and 41 between the lands 44 and 46 thereof. In such position of the spool, passages 47 and 48 also intersecting the bore 23 will be blocked. As seen in FIGS. 1 and 2, such passages connect the pilot line of the valve 19 to drain through the bore 24. The spool 42 thus alternately opens and closes the passages 41 and 47 to connect the pilot line of valve 19 to pressure or drain causing the same to shift.

The piloting spool 42 is hollow and freely slides on hollow stem 50 of piston 51. A lock ring 52 is mounted on the stem 50 and the spool 42 is freely movable on the stem between the lock ring 52 and the piston head 51.

The bore 23 is slightly enlarged at one end as indicated at 54 and fitted within such enlargement is a sleeve 55 sealed to the bore enlargement as indicated by the O-rings 56, 57 and 58.

The center of the sleeve 55 is recessed as indicated at 60 and provided with a plurality of apertures 61 which provide fluid communication between the interior of the sleeve and passage 62 which leads to a ball check valve 63 mounted in such passage and through tapped opening 64 to pressure pulse line 15. A branch passage 66 around the ball check unit 63 intersects bore 67 having therein an adjustable stem 68 which may be advanced or retracted by means of screw 69 threaded in boss 70 on the cover 26. A nut 71 will be employed to hold the stem 68 in the adjusted position. The ball check unit 63 and the variable restrictor 68 thus serves as a flow control unit in the pulse generating line 15 connected to the exhaust line 11 at 16 of the feed cylinder 1. The line 15 and the passage 62 connected thereto, which includes the flow control unit, then terminates in pulse generating chamber 72 formed in the bore 23 by the recess 60 in the sleeve 55.

The end 74 of the stem 50 of the piston 51 is then mounted in the sleeve 55 for reciprocatory movement and the end face thereof is exposed to the chamber 72. Also mounted in the sleeve 55 is a piston 75 which has one end face vis-a-vis the end face of stem 50 exposed to the chamber 72 and the other end face exposed to chamber or passage 76 in end cover 26 which is in fluid communication with the pressure bore 22. The bore in hollow stem 50 and piston 51 accommodates therein an adjustable dowel pin 77 which may be mounted in bushings 78 and 79 in the ends of the piston and stem, respectively.

The dowel pin 77 at one end engages the face of the piston 75 exposed to the chamber 72. At the opposite end, it engages the end 80 of a stop screw 81 threaded in boss 82 in the cover plate 25. A nut 83 may be employed to hold the stop screw 81 in the desired position and an O-ring seal 84 is employed to seal the shank of the stop with respect to the cover.

It is now believed apparent that the stem 50 and piston 51 of the pulse generating unit constitutes a differential area piston with the piston 51, of larger area, being exposed to the chamber 85 in the end of bore 23 and the stem 50 of smaller area being exposed to the chamber 72 in the sleeve 55.

Fluid pressure is communicated to the chamber 85 through passage 86 leading from the four-way spring offset valve 19. The passage 86 leading from the valve 19 to the chamber 85 may then either be connected directly to pressure bore 22 through passage 34 or to drain through passage 87 depending upon the position of the valve 19. Pressure applied through the passage 86 to the chamber 85 will cause the piston 51 and thus the stem 50 to move to the right as seen in FIG. 4 causing the end of the stem to enter the chamber 72 and abut against the face of piston 75 exposed to such chamber 72. When the piston stem 50 and the piston 75 have engaged, there will be no further reduction in the volume of the chamber 72 and the generated pulse will then have been created. However, the piston stem 50 may continue to move to the right pushing the piston 75 into the chamber 76 since it will be understood that the force acting on the larger area of the piston 51 will overcome the force acting on the smaller exposed area of the piston 75, the pressures being otherwise equal. The piston head 51 will continue to move until it engages the end land 45 of the spool 42 causing the same to shift in turn causing the valve 19 to shift to reverse the cycle. The piston stem 50 may continue to move to the right as seen in FIG. 4 until the ring 52 engages the end of the sleeve 55. When the passage 86 is connected to drain by movement of the valve 19, the force acting on piston 75 in chamber 76 will be greater than the force acting on piston 51 and the piston 75 will then cause the stem 50 and the piston 51 to move to the left to the extent governed by the dowel pin 71 and its engagement with the stop screw 80. The volume of the generated pulse is thus obtained by the adjusting screw 80 and it then positions the piston stem 50 with respect to the piston 75. The constant hydraulic pressure applied to the back of the piston 75 maintains the piston against the dowel pin 77, maintaining the proper selected adjustment.

It is noted that the bore 23 will be provided with proper fluid communication to the drain bore 24 so that movement of the piston 51, stem 52, and the spool 42 will not be precluded.

In operation, with a start of the pulse stroke, the piston 50, 51 and the spool 42 will be in the positions shown in FIGS. 1 and 4. The proper adjustments of the restrictors 35 and 68 will have been made and the stop screw 81 will be adjusted to obtain the desired volume of the pulse. Pilot pressure is then applied through the passages 40 and 41 to the valve 19 with the spool 42 in its FIG. 1 position shifting the valve 19 to communicate fluid pressure from the pressure bore 22 through passage 34, resistor 35 and to passage 86 leading to the chamber 85. Movement of piston 51 and thus the stem 50 now occurs with the same moving to the right with the end of the stem projecting into the chamber 72 causing fluid to flow through the line 15 into the machine tool feed cylinder 1 which, if proper volume and speed control adjustments have been made, will cause the piston 2 to withdraw or retract thereby affecting the surface finish and breaking the continuous chip formed at the cutting tool 5. The rise time of the pulse will, of course, be controlled by the restrictor 35 and if it is completely opened, the piston 51 will move to the right at maximum speed creating a sharp rise pulse. In any event, when the stem 50 engages the piston 75 moving the same to the right, the rise of the pulse will be completed and the remaining time consumed will create the dwell of the pulse. After the tool has been withdrawn by the reversing of the piston 2 due to the generated rise of the pulse, the pressure created by the pump 8 will then continue to move the piston 2 to the right at its uniform feed rate governed by the flow control 12. During the last portion of the pulse stroke, the piston 51 will engage the end land 45 of the spool 42 shifting the same to the right as seen in FIG. 4 blocking fluid communication between the passages 40 and 41 and opening fluid communication between the passages 47 and 48 connecting the pilot line of the valve 19 to drain.

The valve 19 will now shift to the position shown in FIG. 2 blocking the pressure line 34 and connecting the passages 86 and 87 and thus the chamber 85 to drain.

Piston 75, which has constant fluid pressure behind it, now proceeds to push the piston stem 50 back to its start position. The piston 75 will push the piston stem 50 and the dowel 77 to the left as seen in FIGS. 1 and 2 until the dowel 77 contacts the stop screw 81. Until this contact, the generated pulse has been in a position of dwell. Now, the fluid pressure obtained from the machine tool acting through the line 15 and the passage 62 on the end of the stem 50 exposed to the chamber 72 will cause the piston stem 50 to continue to move to the left and the speed of this return movement which is the return pulse or decay thereof is controlled by the restrictor 68. During this portion of the pulse, the feed of the tool 5 may be caused to surge and feed into the work at a rate faster than the otherwise uniform feed rate. However, it will readily be understood that to pulse "in" only, the restrictor 68 would be completely closed and a separate hydraulic line would be connected from the pump to chamber 72 so that a surge or feed rate faster than the otherwise normal feed rate would not be obtained.

During the last portion of the "out" pulse stroke or movement of the piston and stem to the left as seen in FIGS. 1 and 2, the ring 52 will engage the end land 46 of the spool 42 causing the same to shift to the left as seen in FIG. 4 again opening communication between the passages 40 and 41 and closing communication between the passages 47 and 48 to cause again the valve 19 to shift to its FIG. 1 position. In any event, with the pulse generator of the present invention, waves with both forward and reverse slope may be imparted to the work in lieu of the microscopic screw thread normally imparted to the work with a uniform feed rate. Not only can the surface finish be affected by the generated pulse, but by controlling the frequency of the pulse, the surface finish obtainable is no longer a function solely of the feed rate. Thus a surface finish can be imparted to the workpiece independently of the feed rate and the surface finish is no longer tied to the production rate.

With the illustrated embodiment, a frequency of 30 cycles per second can be obtained with a 7 g.p.m. input. This frequency, of course, can be varied by adjusting the speed control "in" screw stem 35 or the speed control "out" screw stem 68. Preferably, at least one pulse wave will be created for every revolution of the workpiece W and it is desirable that the revolution of the workpiece and the frequency of the generated pulse be not in synchronism so that no set pattern will be produced on the workpiece, but simply a random series of waves with both forward and reverse slope which will provide the desired finish. Whereas the differential area piston 50, 51 is illustrated with the small end toward the pulse discharge side, it will readily be understood that an opposite configuration of the differential area piston may be provided whereby the enlarged end would be extending into the chamber 72. This, of course, would depend upon the relative pressures available at both ends of the piston. In any event, nothing other than the source 8 of hydraulic fluid under pressure is required to operate the pulse generating unit 14 of the present invention and such can readily be connected to most machine tools employing a feed cylinder of the type shown in FIGS. 1 and 2 simply by connecting the lines 17 and 15 to the already available hydraulic circuit.

It can now be seen that a simplified pulse generating unit of compact size can be provided for a machine tool feed cylinder which will vary the otherwise uniformly varying volume of the fluid discharged from the cylinder to create pulses at the desired frequency which will impart the desired finish to the workpiece, create a discontinuous or broken chip, and not require that the workpiece be set at a false angle to the slide or tool holder in that the pressure of the tool 5 on the workpiece is not constant.

Other modes of applying the principle of the invention may be employed, change being made as regards the details described, provided the features stated in any of the following claims or the equivalent of such be employed.

We, therefore, particularly point out and distinctly claim as our invention:

1. In a hydraulic feed piston-cylinder assembly for cutting tools and the like, a source of hydraulic fluid under pressure connected to one end of said assembly, an exhaust line leading to a hydraulic drain connected to the other end of said assembly, a flow regulator in said exhaust line operative to control the feed rate for said assembly, a fluid chamber connected to said exhaust line ahead of said flow regulator, reciprocable piston means projecting into said fluid chamber operative to vary the volume of said chamber to modify the feed rate of said assembly, and hydraulically driven valve means operative to reciprocate said piston thus to modify the relatively uniform feed rate of said assembly.

2. The combination set forth in claim 1 including means responsive to the reciprocation of said piston to shift said valve means.

3. The combination set forth in claim 2 wherein said piston comprises a differential area piston, a spool mounted on said piston and having a lost motion connection therewith, and means responsive to the completion of a stroke of said piston to shift said spool thus to operate said valve means.

4. The combination set forth in claim 3 including means operative to limit the stroke of said piston and thus the volume of fluid in said chamber displaced thereby.

5. The combination set forth in claim 4 including control means operative to control the speed of reciprocation of said piston in either direction.

6. The combination set forth in claim 5 including a second piston projecting into said chamber, a dowel pin projecting through said first piston and engaging said second piston, and an adjusting screw operative to engage said dowel pin to control the position of said second piston with respect to said first piston.

7. The combination set forth in claim 6 wherein said first piston comprises a differential area piston, said valve means alternately connecting the larger area of said differential area piston to a source of hydraulic fluid under pressure and to drain.

8. The combination set forth in claim 7 including a variable restrictor in the pressure line leading to the larger area end of said differential area piston operative to control the speed of movement of said piston in one direction.

9. A hydraulic feed piston-cylinder assembly for cutting tools and the like, a source of hydraulic fluid under pressure connected to one end of said assembly, an exhaust line connecting the other end of said assembly to drain, a flow regulator in said exhaust line, a fluid chamber connected to said exhaust line ahead of said flow regulator, reciprocable piston means projecting into said chamber operative to create fluid pulses in the exhaust line of said assembly, pilot valve means operative to control the reciprocation of said piston means, and means responsive to the reciprocation of said piston means to control said pilot valve means.

10. A hydraulic feed piston-cylinder assembly as set forth in claim 9 wherein said piston means comprises a differential area piston having one end projecting into said chamber, said pilot valve means alternately pressurizing and venting the other end of said differential area piston.

11. A hydraulic feed piston-cylinder assembly as set forth in claim 9 wherein said last mentioned means comprises a spool mounted on said piston means having a lost motion connection therewith operative to operate said pilot valve means at the end of each stroke thereof.

References Cited by the Examiner

UNITED STATES PATENTS

| | | | |
|---|---|---|---|
| 899,569 | 9/08 | Siegmund | 60—10.5 |
| 2,346,857 | 4/44 | Meredith | 60—10.5 X |
| 2,506,093 | 5/50 | MacDuff | 60—10.5 X |

FOREIGN PATENTS

| | | |
|---|---|---|
| 415,435 | 6/25 | Germany. |

JULIUS E. WEST, *Primary Examiner.*

ROBERT R. BUNEVICH, *Examiner.*